(12) United States Patent
Eriksson

(10) Patent No.: US 11,991,982 B2
(45) Date of Patent: May 28, 2024

(54) TOOL-PICKUP SYSTEM, METHOD, COMPUTER PROGRAM AND NON-VOLATILE DATA CARRIER

(71) Applicant: DELAVAL HOLDING AB, Tumba (SE)

(72) Inventor: Andreas Eriksson, Tumba (SE)

(73) Assignee: DeLaval Holding AB, Tumba (SE)

( * ) Notice: Subject to any disclaimer, the term of this patent is extended or adjusted under 35 U.S.C. 154(b) by 473 days.

(21) Appl. No.: 17/290,704

(22) PCT Filed: Oct. 28, 2019

(86) PCT No.: PCT/SE2019/051068
§ 371 (c)(1),
(2) Date: Apr. 30, 2021

(87) PCT Pub. No.: WO2020/091666
PCT Pub. Date: May 7, 2020

(65) Prior Publication Data
US 2022/0015326 A1    Jan. 20, 2022

(30) Foreign Application Priority Data
Nov. 1, 2018    (SE) .................................... 1800211-3

(51) Int. Cl.
*A01J 5/007*    (2006.01)
*A01J 7/02*    (2006.01)
(Continued)

(52) U.S. Cl.
CPC ................. *A01J 5/007* (2013.01); *A01J 7/02* (2013.01); *B25J 9/1697* (2013.01);
(Continued)

(58) Field of Classification Search
CPC ........... A01J 5/007; A01J 7/02; G06T 7/0008; G06T 7/30; G06T 7/70; G06T 1/0014;
(Continued)

(56) References Cited

U.S. PATENT DOCUMENTS

2010/0278374 A1    11/2010    Hallstrom et al.
2011/0061596 A1    3/2011    Nilsson et al.
(Continued)

FOREIGN PATENT DOCUMENTS

| EP | 2 078 456 | 7/2009 |
|---|---|---|
| EP | 2 907 377 | 8/2015 |
| WO | 2009/093965 | 7/2009 |

OTHER PUBLICATIONS

International Search Report for PCT/SE2019/051068 dated Feb. 3, 2020, 3 pages.

*Primary Examiner* — Daniel G Mariam
(74) *Attorney, Agent, or Firm* — NIXON & VANDERHYE

(57) ABSTRACT

Tools in an automatic milking arrangement are picked up by using a robotic arm (110). The robotic arm (110) moves a camera (130) to an origin location (PC) from which the camera (130) registers three-dimensional image data (Dimg3D) of at least one tool (141, 142, 143, 144). The three-dimensional image data is processed using an image-based object identification algorithm to identify objects in the form of the tools and hoses (152). In response to identifying at least one tool, a respective tool position (PT1, PT3, PT4) is determined for each identified tool based on the origin location (PC) and the three-dimensional image data. Then, a grip device (115) is exclusively controlled to the one or more of the respective tool positions (PT1, PT3, PT4) to perform a pick-up operation. Thus, futile attempts to pick-up non-existing or blocked tools can be avoided.

18 Claims, 2 Drawing Sheets

(51) Int. Cl.
- *B25J 9/16* (2006.01)
- *B25J 11/00* (2006.01)
- *B25J 13/08* (2006.01)
- *G06T 1/00* (2006.01)
- *G06T 7/00* (2017.01)
- *G06T 7/30* (2017.01)
- *G06T 7/70* (2017.01)
- *G06V 20/10* (2022.01)
- *G06V 20/64* (2022.01)
- *G08B 21/18* (2006.01)
- *H04N 13/207* (2018.01)
- *H04N 23/695* (2023.01)
- *B25J 15/00* (2006.01)

(52) U.S. Cl.
CPC ........... *B25J 11/0045* (2013.01); *B25J 13/08* (2013.01); *G06T 1/0014* (2013.01); *G06T 7/0008* (2013.01); *G06T 7/30* (2017.01); *G06T 7/70* (2017.01); *G06V 20/10* (2022.01); *G06V 20/64* (2022.01); *G08B 21/18* (2013.01); *H04N 13/207* (2018.05); *H04N 23/695* (2023.01); *B25J 15/0052* (2013.01); *G06T 2207/30164* (2013.01)

(58) Field of Classification Search
CPC ........ G06T 2207/30164; H04N 13/207; H04N 23/695; G06V 20/10; G06V 20/64; B25J 9/1697; B25J 11/0045; B25J 13/08; B25J 15/0052; G08B 21/18
See application file for complete search history.

(56) References Cited

U.S. PATENT DOCUMENTS

2013/0019807 A1* 1/2013 Holmqvist ............ A01J 5/0175
119/14.45
2018/0343823 A1* 12/2018 Wisse .................. B25J 11/0045

* cited by examiner

TOOL-PICKUP SYSTEM, METHOD, COMPUTER PROGRAM AND NON-VOLATILE DATA CARRIER

CROSS-REFERENCE TO RELATED APPLICATIONS

This application is the U.S. national phase of International Application No. PCT/SE2019/051068 filed Oct. 28, 2019 which designated the U.S. and claims priority to SE 1800211-3 filed Nov. 1, 2018, the entire contents of each of which are hereby incorporated by reference.

TECHNICAL FIELD

The present invention relates generally to the handling of teat-cups and cleaning cups in automatic milking arrangements. Especially, the invention relates to a tool-pickup system for an automatic milking arrangement and a method implemented in such a system. The invention also relates to a computer program and a non-volatile data carrier.

BACKGROUND

Today's automatic milking arrangements are highly complex installations. For example, in such a system, a milking robot may be arranged to attach teatcups and other tools, e.g. cleaning cups, to the animals in a fully automatic manner. Thus, the milking robot must be capable of automatically retrieving relevant tools from a storage place and possibly returning them thereto after completing each stage of the milking procedure.

In the prior-art solutions, the respective tool positions are programmed into to the milking robot. As a result, the milking robot can move its grip device to the relevant position whenever a particular tool is to be picked up. However, due to various error events the tool in question may not actually be located at the expected position. For example, a retraction mechanism for the tool may be broken; the animal may have kicked off the tool from the udder and placed its hoof on hose etc. In such cases, the milking robot may attempt to pick up a non-existing tool for a considerable period of time before some kind of alarm function is triggered. Of course, this is an inefficient behavior. Moreover, the milking robot risks damaging the equipment during its futile pick-up attempts.

SUMMARY

The object of the present invention is therefore to offer a solution, which improves the chances of controlling a milking robot in an adequate manner and reducing time wastage in connection with missing tools and/or tools being misplaced.

According to one aspect of the invention, the object is achieved by a tool-pickup system for an automatic milking arrangement. The system includes a robotic arm and a control unit. The robotic arm is provided with a grip device configured to pick up tools, preferably represented by one or more teatcups and/or one or more cleaning cups. The robotic arm is also provided with a camera configured to register three-dimensional image data. The control unit is configured to control the robotic arm to move the camera to an origin location from which at least one tool is expected to be visible within a view field of the camera. The control unit is further configured to obtain three-dimensional image data registered by the camera at the origin location, and process the three-dimensional image data using an image-based object identification algorithm to identify objects in the form of tools and/or hoses. In response to identifying at least one tool, the control unit is configured to determine a respective tool position for each identified tool based on the origin location and the three-dimensional image data. The control unit is exclusively configured to control the grip device to one or more of the respective tool positions to perform a pick-up operation.

This tool-pickup system is advantageous because it avoids futile pick-up attempts in a highly efficiently manner. As a result, time is economized and the risk that the grip device happens to damage a milking hose can be lowered.

According to one embodiment of this aspect of the invention, the control unit is further configured to produce an alert in response to identifying at least one hose at a position where one of the tools should be present in a current stage of a procedure executed by the automatic milking arrangement. For example, the current stage may be the beginning of a milking session, and at this stage, all tools should be placed in a storage rack. If one or more of the tools are missing, this an anomaly indicator. Thus, encountering a hose in the storage rack triggers the alert, and thereafter adequate troubleshooting measures can be taken very promptly.

According to another embodiment of this aspect of the invention, the control unit is configured to process the three-dimensional image data by searching for the tools in at least one predefined volume within the view field. Thus, the data search can be made more efficient by being adapted to the physical operation of the automatic milking arrangement. For example, the at least one predefined volume may contain a respective line or arc for each of the tools along which line the expected tool positions are defined within a range from a closest to a furthest position. This is advantageous if the tools are placed in a milking stall on a rotary milking parlor, which lateral position may vary slightly according to a linear relationship depending upon where the milking parlor stops. Naturally, if the rotary milking parlor does not stop, i.e. rotates continuously, it is even more important to search for the tools in a predefined line or arc shaped volumes. Alternatively, if a milking robot is arranged to attach teatcups to animals in a fixed station, the at least one predefined volume preferably contains a respective area, e.g. circle formed, for each of the tools, within which respective area expected tool positions are defined.

According to yet another embodiment of this aspect of the invention, after having controlled the grip device to perform a pickup operation at a particular one of said tool positions, the control unit is configured to exclude the predefined volume for said particular one tool position from a subsequent search for at least one remaining tool of said tools in the three-dimensional image data. Consequently, the search can be focused to those volumes where tools may actually be located.

According to another aspect of the invention, the object is achieved by a method for picking up tools in an automatic milking arrangement. The method involves registering three-dimensional image data by means of a camera arranged on a robotic arm. Specifically, the robotic arm is controlled to move the camera to an origin location from which at least one tool is expected to be visible within a view field of the camera. The method further involves obtaining three-dimensional image data that have been registered by the camera at the origin location. The three-dimensional image data are processed using an image-based object identification algorithm to identify objects in the form of tools and/or hoses. In response to identifying at least one tool, the method involves determining a respective tool position for each identified tool based on the origin location and the three-dimensional image data. A grip device on the robotic arm is exclusively controlled to one or more of the respective tool positions to perform a pick-up operation. The advantages of this method, as well as the preferred embodiments thereof, are apparent from the discussion above with reference to the system.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
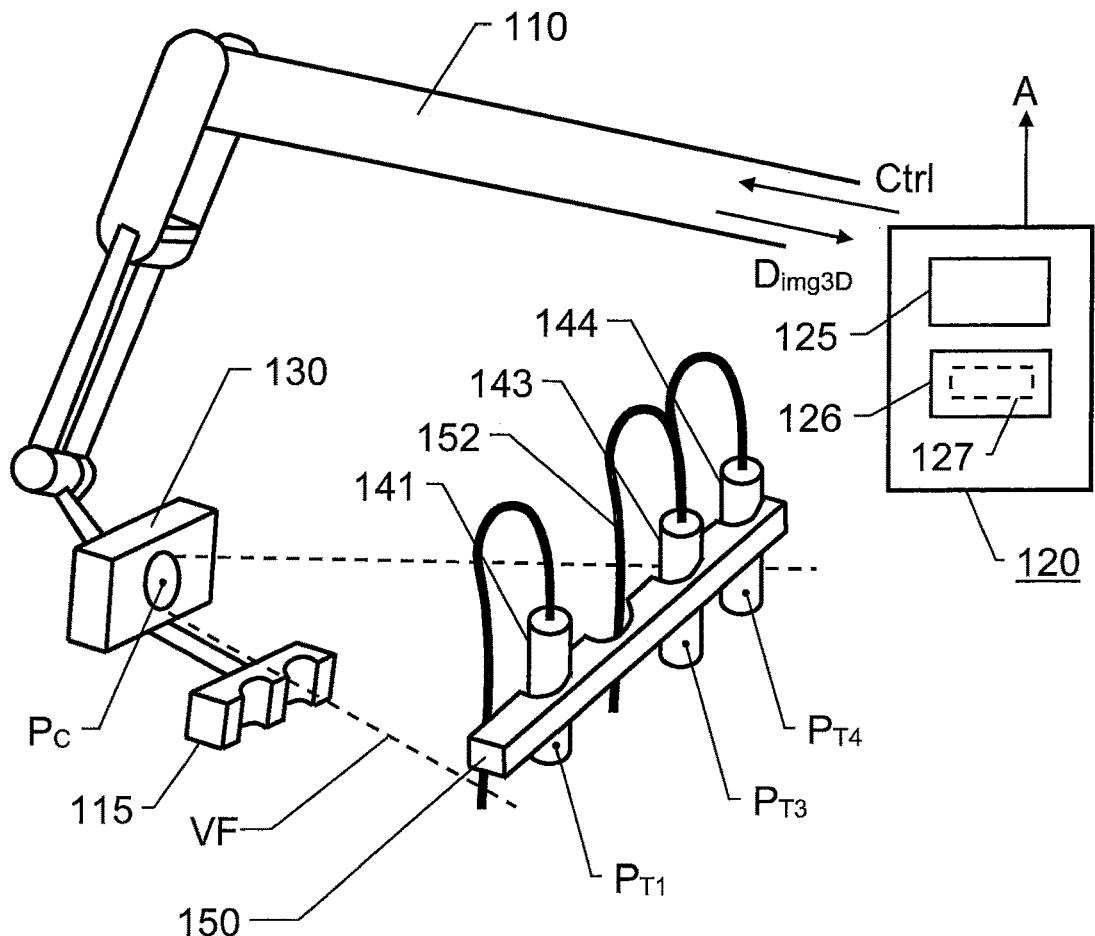
FIG. 1 shows a tool-pickup system according to one embodiment of the invention.

In FIG. 1, we see an embodiment of a tool-pickup system for an automatic milking arrangement according to one embodiment of the invention.

The tool-pickup system contains a robotic arm 110 and a control unit 120. The robotic arm 110, in turn, is provided with a grip device 115 configured to pick up tools, and a camera 130 configured to register three-dimensional image data $D_{img3D}$.

The control unit 120 is arranged to control the robotic arm 110 to move the camera 130 to an origin location $P_C$ from which at least one tool is expected to be visible within a view field VF of the camera 130. In each point in time, the control unit 120 has accurate information about the exact location of the origin location $P_C$, e.g. via a control system for the robotic arm 110.

In FIG. 1, the tools are exemplified by teatcups 141, 143 and 144 arranged in a rack 150. As can be seen, at a position where a second teatcup should have been present, a hose 152 is instead located. For instance, this may be due to that a retraction mechanism for the second teatcup is broken, or that the animal being milked is standing on the second teatcup or its hose. According to the invention, the control unit 120 is configured to obtain three-dimensional image data $D_{mig3D}$ having been registered by the camera 130 at the origin location $P_C$. The control unit 120 is further configured to process the three-dimensional image data $D_{img3D}$ using an image-based object identification algorithm to identify objects in the form of tools 141 and 143 and 144 and/or hoses 152. In response to identifying at least one tool, i.e. 141, 143 and 144 in FIG. 1, the control unit 120 is configured to determine a respective tool position $P_{T1}$, $P_{T3}$ and $P_{T4}$ for each identified tool 141, 143 and 144 based on the origin location $P_C$ and the three-dimensional image data $D_{img3D}$. The control unit 120 is configured exclusively to control the grip device 115 to one or more of the respective tool positions $P_{T1}$, $P_{T3}$ and $P_{T4}$ to perform a pick-up operation. In other words, no pick-up operation will be performed at a position where the missing second tool should have been positioned.

Instead, according to one embodiment of the invention, in response to identifying the hose 152 at a position where a tool should be present in a current stage of the procedure being executed by the automatic milking arrangement, the control unit 120 is configured to produce an alert A. In FIG. 1, the alert A is symbolized by an outgoing signal, which may be configured to trigger an alarm or an error signal in the automatic milking arrangement.

Figure 2:
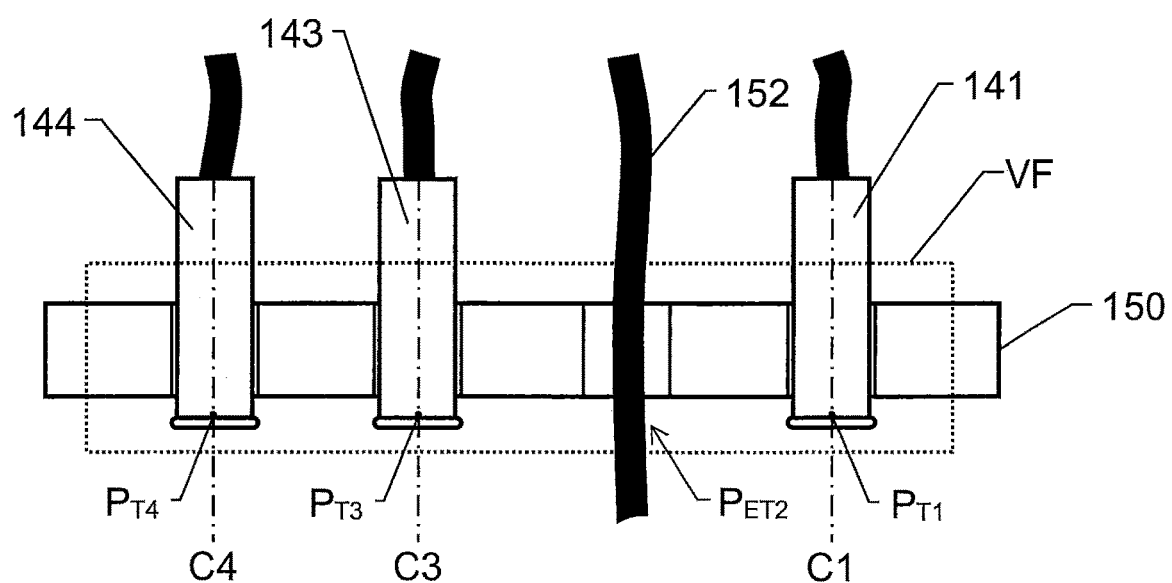
FIG. 2 illustrates a camera view field of a tool rack according to one embodiment of the invention.

FIG. 2 illustrates a view field VF of the camera 130. The view field VF covers a tool rack 150 in which first, third and fourth tools 141, 143 and 144 respectively are located. By processing the three-dimensional image data $D_{img3D}$ using the image-based object identification algorithm, the control unit 120 has identified objects in the form of tools at expected tool positions $P_{ET1}$, $P_{ET3}$ and $PE_{T4}$. However, at an expected tool position $P_{ET2}$ for a second tool, a hose 152 is found instead. Thus, the control unit 120 will exclusively control the grip device 115 to the positions $P_{ET1}$, $P_{ET3}$ and $P_{ET4}$.

The expected tool positions $P_{ET1}$, $P_{ET2}$, $P_{ET3}$ and $P_{ET4}$ may be represented by the space coordinates for a particular point on the tool in question, i.e. 141, 142, 143 and 144 respectively. The particular point is preferably a well-defined point on the tool, such as an intersection between a symmetry center C1, C3 or C4 of a teatcup body and a liner's edge to the teatcup body. The position for the particular point may be calculated based on the origin location $P_C$ and data, e.g. a space vector, expressing a distance in three dimensions from the origin location $P_C$ to the particular point.

Figure 3:
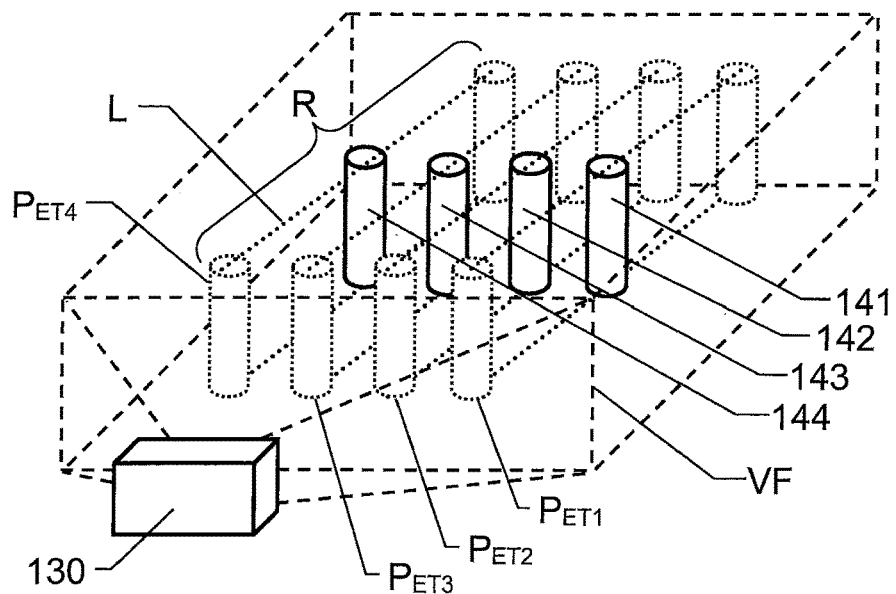
FIG. 3-4 illustrates ranges of expected tool positions according to embodiments of the invention.

Preferably, the control unit 120 is configured to process the three-dimensional image data $D_{img3D}$ by searching for the tools 141, 142, 143 and 144 in at least one predefined volume within the view field VF of the camera 130. FIG. 3 illustrates a set of ranges of expected tool positions $P_{ET1}$, $P_{ET2}$, $P_{ET3}$ and $P_{ET4}$ according to a first embodiment of the invention.

Here, the at least one predefined volume contains a respective line L for each of the tools 141, 142, 143 and 144, along which respective line L the expected tool positions $P_{ET1}$, $P_{ET2}$, $P_{ET3}$ and $P_{ET4}$ are defined within a range R from a closest expected tool position to a furthest expected tool position. This definition of the at least one predefined volume is advantageous if the tools 141, 142, 143 and 144 are placed in a milking stall on a rotary milking parlor. Namely, in such a case, the lateral position may vary somewhat in a linear manner depending on where the milking parlor stops in relation to the milking robot and its arm 110. In fact, in the rotary-milking-parlor case, the variation will be along an arc of very long radius. This is, of course, also true if the milking parlor never stops, i.e. rotates continuously. However, in practice, the arc shape can often be approximated to the straight line L.

Figure 4:
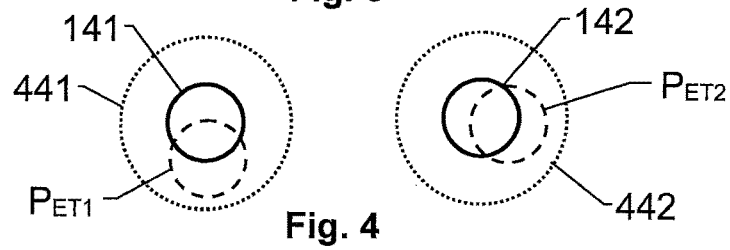

FIG. 4 illustrates a set of ranges of expected tool positions according to a second embodiment of the invention. Here, the at least one predefined volume contains a respective circular-shaped area 441 and 442 in which expected tool positions $P_{ET1}$ and $P_{ET2}$ are defined for a first and a second tool 141 and 142 respectively. This definition of the at least one predefined volume is advantageous if a milking robot is arranged to attach the tools 141 and 142 to animals in a fixed station, for example a voluntary milking system, which animals visit on their own volition. In such a design, the positions for tools 141 and 142 are more likely to have an evenly distributed probability around a most probable central coordinate.

For improved efficiency, after having controlled the grip device 115 to perform a pick-up operation at a particular tool position $P_{ET1}$, $P_{ET2}$, $P_{ET3}$ and $P_{ET4}$, the control unit 120 is preferably configured to exclude the predefined volume for that particular one tool position from a subsequent search for at least one remaining tool of said tools in the three-dimensional image data $D_{img3D}$. Namely, after having removed a certain tool, for example from the rack 150, the corresponding tool position in the rack 150 should be empty, and therefore it is meaningless to search for tools here.

However, any detected hoses, e.g. 152, at a position from which a tool has already been removed may serve as a reference object confirming the fact that the tool in question has indeed been picked up by the grip device 115.

It is generally advantageous if the control unit 120 is configured to effect the above-described procedure in an automatic manner by executing a computer program 127. Therefore, the control unit 120 may include a memory unit 126, i.e. non-volatile data carrier, storing the computer program 127, which, in turn, contains software for making processing circuitry in the form of at least one processor 125 in the control unit 120 execute the above-described actions when the computer program 127 is run on the at least one processor 125.

Figure 5:
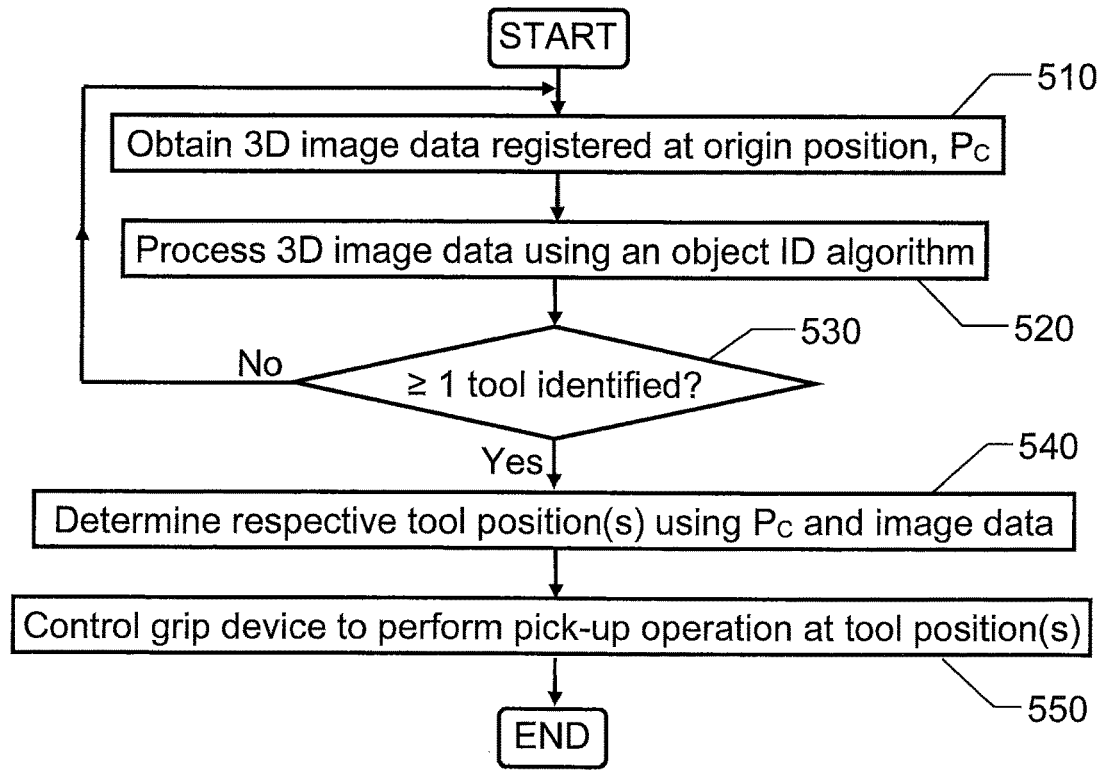
FIG. 5 illustrates, by means of a flow diagram, the general method according to the invention.

In order to sum up, and with reference to the flow diagram in FIG. 5, we will now describe the general method according to the invention for picking up tools in an automatic milking arrangement.

In a first step 510, three-dimensional image data are obtained, which have been registered by a camera at an origin location $P_C$ to which the camera has been controlled by a robotic arm. At the origin location, at least one tool is expected to be visible within a view field of the camera.

In a subsequent step 520, the three-dimensional image data are processed using an image-based object identification algorithm to identify objects in the form of tools and/or hoses.

Thereafter, a step 530 checks if at least one tool has been identified in the three-dimensional image data. If so, a step 540 follows; and otherwise, the loops back to step 510 for obtaining updated data.

In step 540, a respective tool position is determined for each identified tool based on the origin location and the three-dimensional image data. Here, the respective tool position may be represented by the space coordinates for a particular point on the tool in question. The position for the particular point can for example be calculated based on the origin location and data, e.g. a space vector, expressing a distance in three dimensions from the origin location to the particular point. The particular point, in turn, is preferably a well-defined point on the tool, such as an intersection between a symmetry center of a teatcup body and a liner's edge to the teatcup body.

Subsequently, in a step 550, a grip device on the robotic arm is controlled to perform a pick-up operation at the respective tool position(s) where tool(s) has/have been identified. However, the grip device is not controlled to any other positions to perform any pick-up operations.

Then, the procedure loops back to step 510.

All of the process steps, as well as any sub-sequence of steps, described with reference to FIG. 5 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A tool-pickup system for an automatic milking arrangement, the tool-pickup system comprising:
    a robotic arm (110) provided with a grip device (115) configured to pick up tools (141, 142, 143, 144), and a camera (130) configured to register three-dimensional image data (Dimg3D); and
    a control unit (120) operatively connected to the robotic arm, the control unit (120) configured to:
    control the robotic arm (110) to move the camera (130) to an origin location (PC) from which at least one tool of the tools (141, 142, 143, 144) is expected to be visible within a view field (VF) of the camera (130),
    obtain three-dimensional image data (Dimg3D) registered by the camera (130) at the origin location (PC),
    process the three-dimensional image data (Dimg3D) using an image-based object identification algorithm to identify objects in a form of the tools (141, 143, 144) and/or hoses (152), and
    in response to identifying at least one of the tools (141, 143, 144):
    i) determine a respective tool position (PT1, PT3, PT4) for each identified tool (141, 143, 144) based on the origin location (PC) and the three-dimensional image data (Dimg3D), and ii) exclusively control the grip device (115) to one or more of the respective tool positions (PT1, PT3, PT4) to perform a pick-up operation, wherein the control unit (120) is further configured to produce an alert (A) in response to identifying at least one hose (152) at a position where, in a current stage of a procedure executed by the automatic milking arrangement, one of said tools (141, 142, 143, 144) should be present.

2. The tool-pickup system according to claim 1, wherein the control unit (120) is configured to process the three-dimensional image data (Dimg3D) by searching for the tools (141, 142, 143, 144) in at least one predefined volume (L, R; 441, 442) within the view field (VF).

3. The tool-pickup system according to claim 2, wherein the at least one predefined volume comprises a respective line (L) or arc for each of the tools (141, 142, 143, 144) along which respective line (L) expected tool positions (PET1, PET2, PET3, PET4) are defined within a range (R).

4. The tool-pickup system according to claim 3, wherein, after having controlled the grip device (115) to perform a pick-up operation at a particular one of said tool positions (PT1, PT3, PT4), the control unit (120) is configured to exclude the predefined volume for said particular one tool position from a subsequent search for at least one remaining tool of said tools in the three-dimensional image data (Dimg3D).

5. The tool-pickup system according to claim 2, wherein the at least one predefined volume comprises a respective area (441; 442) for each of the tools (141, 142) within which respective area (441; 442) expected tool positions (PET1, PET2) are defined.

6. The tool-pickup system according to claim 5, wherein, after having controlled the grip device (115) to perform a pick-up operation at a particular one of said tool positions (PT1, PT3, PT4), the control unit (120) is configured to exclude the predefined volume for said particular one tool position from a subsequent search for at least one remaining tool of said tools in the three-dimensional image data (Dimg3D).

7. The tool-pickup system according to claim 2, wherein, after having controlled the grip device (115) to perform a pick-up operation at a particular one of said tool positions (PT1, PT3, PT4), the control unit (120) is configured to exclude the predefined volume for said particular one tool position from a subsequent search for at least one remaining tool of said tools in the three-dimensional image data (Dimg3D).

8. The tool-pickup system according to claim 1, wherein the tools comprise at least one of:
one or more teatcups and one or more cleaning cups.

9. The tool-pickup system according to claim 1, wherein the tools comprise at least one teatcup and at least one cleaning cup.

10. A method for picking up tools in an automatic milking arrangement, the method comprising:
controlling a robotic arm (110) to move a camera (130) arranged on the robotic arm (110) to an origin location (PC) from which at least one tool of the tools (141, 142, 143, 144) is expected to be visible within a view field (VF) of the camera (130);
using the camera (13) to register three-dimensional image data (Dimg3D) within the view field (VF) of the camera (130);
obtaining the three-dimensional image data (Dimg3D) registered by the camera (130) at the origin location (PC);
processing the three-dimensional image data (Dimg3D) using an image-based object identification algorithm to identify objects in a form of tools (141, 143, 144) and/or hoses (152), and
in response to identifying at least one tool of the tools (141, 143, 144):
i) determining a respective tool position (PT1, PT3, PT4) for each identified tool (141, 143, 144) based on the origin location (PC) and the three-dimensional image data (Dimg3D), and
ii) exclusively controlling a grip device (115) on the robotic arm (110) to one or more of the respective tool positions (PT1, PT3, PT4) to perform a pick-up operation of each respective identified tool (141, 143, 144); and
producing an alert (A) in response to identifying at least one hose (152) at a position where, in a current stage of a procedure executed by the automatic milking arrangement, one of said tools (141, 142, 143, 144) should be present.

11. The method according to claim 10, comprising:
processing the three-dimensional image data (Dimg3D) by searching for each of the tools (141, 142, 143, 144) in at least one predefined volume (L, R; 441, 442) within the view field (VF).

12. The method according to claim 11, wherein the at least one predefined volume is represented by a respective line (L) or arc for each of the tools (141, 142, 143, 144) along which respective line (L) expected tool positions (PET1, PET2, PET3, PET4) are defined within a range (R).

13. The method according to claim 12, wherein, after having controlled the grip device (115) to perform a pick-up operation at a particular one of said tool positions (PT1, PT3, PT4), the method comprises excluding the predefined volume for said particular one tool position from a subsequent search for at least one remaining tool of said tools in the three-dimensional image data (Dimg3D).

14. The method according to claim 11, wherein the at least one predefined volume is represented by a respective area (441; 442) for each of the tools (141, 142) within which area (441; 442) expected tool positions (PET1, PET2) are defined.

15. The method according to claim 14, wherein, after having controlled the grip device (115) to perform a pick-up operation at a particular one of said tool positions (PT1, PT3, PT4), the method comprises excluding the predefined volume for said particular one tool position from a subsequent search for at least one remaining tool of said tools in the three-dimensional image data (Dimg3D).

16. The method according to claim 11, wherein, after having controlled the grip device (115) to perform a pick-up operation at a particular one of said tool positions (PT1, PT3, PT4), the method comprises excluding the predefined volume for said particular one tool position from a subsequent search for at least one remaining tool of said tools in the three-dimensional image data (Dimg3D).

17. The method according to claim 10, wherein the tools comprise at least one of:
one or more teatcups and one or more cleaning cups.

18. A non-transitory data carrier (126) containing a computer program (127) loadable into a processing unit (125), the computer program (127) comprising software, when executed by the processing unit (125), causes the processing unit to perform the method according claim 10.

* * * * *